(12) United States Patent
Ma

(10) Patent No.: US 7,362,794 B2
(45) Date of Patent: Apr. 22, 2008

(54) CHANNEL EQUALISATION

(75) Inventor: Yugang Ma, Singapore (SG)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 10/662,739

(22) Filed: Sep. 15, 2003

(65) Prior Publication Data

US 2005/0100082 A1    May 12, 2005

(30) Foreign Application Priority Data

Sep. 17, 2002    (SG)    ............... 200205830-3

(51) Int. Cl.
*H04B 1/707* (2006.01)
(52) U.S. Cl. ..................... 375/148; 375/150
(58) Field of Classification Search .......... 375/346, 375/148, 150; 455/137
See application file for complete search history.

(56) References Cited

U.S. PATENT DOCUMENTS

| | | | | |
|---|---|---|---|---|
| 5,090,028 A | * | 2/1992 | Crebouw | ............... 375/354 |
| 5,132,926 A | * | 7/1992 | MacEachern et al. | ........ 708/819 |
| 5,297,171 A | * | 3/1994 | Koch | ............... 375/347 |
| 6,628,700 B1 | * | 9/2003 | Miura | ............... 375/148 |
| 6,847,678 B2 | * | 1/2005 | Berezdivin et al. | ......... 375/146 |
| 6,865,218 B1 | * | 3/2005 | Sourour | ............... 375/148 |
| 6,879,624 B2 | * | 4/2005 | Sano | ............... 375/147 |
| 7,221,698 B2 | * | 5/2007 | Kimata | ............... 375/147 |
| 2002/0176516 A1 | * | 11/2002 | Jeske et al. | ............ 375/316 |
| 2002/0190900 A1 | * | 12/2002 | Kimata et al. | ............ 342/368 |
| 2006/0126715 A1 | * | 6/2006 | Lai et al. | ............... 375/233 |

* cited by examiner

*Primary Examiner*—David C. Payne
*Assistant Examiner*—Leon Flores
(74) *Attorney, Agent, or Firm*—Frommer Lawrence & Haug LLP; William S. Frommer; Thomas F. Presson

(57) ABSTRACT

A method of reducing multiple access interference in a CDMA radio system uses a plurality of rake fingers to pre-process received signals but without demodulation or de-spreading. The outputs of the rake fingers are combined, normalised and then processed by an adaptive equaliser to recover orthogonality lost in transmission. The equaliser output is then subject to de-spreading and de-scrambling to recover the desired user signals. The equaliser is preferably adaptive order, the length being adapted in dependence upon the instantaneous signal to noise ratio.

18 Claims, 4 Drawing Sheets

CHANNEL EQUALISATION

FIELD OF THE INVENTION

The present invention relates to methods and apparatus for channel equalisation.

BACKGROUND OF THE INVENTION

In several fields of communication there exists the need to deal at a receiver with the time-varying nature of a communications channel.

One such field of communication is in code division multiple access (CDMA). CDMA is used in the cdmaOne system (IS-95) and will be used in the so-called third generation (3G) mobile system. Each of these systems uses direct-sequence code division multiple access (DS-CDMA) in which orthogonal spreading codes are used on the down link to multiplex signals to multiple users. The spread signals of all users are combined together synchronously. The sum is scrambled by a long pseudo-noise code and transmitted from a base station. While the transmitted signals for the users within a cell are orthogonal to each other, the multi-path propagation between the base station and the users seriously disrupts the orthogonality in the signals received by the mobile users. Interference between the signals for different users gives rise to what is known as multiple access interference (MAI). The presence of MAI significantly degrades system performance. Various methods have been proposed for suppressing MAI, for example see:

Markku J Heikkila, "Interference Suppression in CDMA Down Link Through Adaptive Channel Equalisation", IEEE Vehicular Technology Conference 1999, which proposes a receiver algorithm which performs adaptive channel equalisation by estimating the transmitted chip sequence;

Stefan Werner, Jorma Lilleberg, "Down Link Channel D-Correlation in CDMA Systems With Long Codes", IEEE Vehicular Technology Conference 1999, which proposes linear detectors which exploit the special signal structure of the downlink transmission;

Irfan Ghauri, Dirk T M Slock, "Linear Receivers for the DS-CDMA Down Link exploiting Orthogonality of spreading Sequences", IEEE Vehicular Technology Conference 1998, which proposes receivers which equalise for the estimated channel (based on the pilot signal) to render the user signals orthogonal, and a code matched filter is then used to cancel MAI for intra-cell users; and Hooli, K, Latva-Aho, M and Juntti, M, "Multiple Access Interference Suppression With Linear Chip Equaliser in WCDMA Down Link Receivers", Globecom '99, which proposes receivers which equalise the channel (on the chip level, so that the system will work with long scrambling codes) prior to de-spreading, to restore orthogonality.

The suppression methods proposed in these papers are all based on the use of finite impulse response (FIR) equalisers.

If the input signal-to-noise ratio is high and if the channel is fixed, a FIR equaliser will usually achieve better performance than that achieved by a rake receiver. However, over a time-varying channel, where deep fading occurs the signal-to-noise ratio can be very low during the deep fading period. Adaptive algorithms do not work very well if there is a low signal-to-noise ratio. Although the periods of low signal-to-noise ratio caused by deep fading do not last long, the existence of low signal-to-noise ratio periods still degrades the convergence of adaptive algorithms. The faster the multi-path fading is, the more frequently low signal-to-noise ratio events occur, and the worse the adaptive equaliser performance becomes. Deep fading is one of the main reasons why adaptive equalisers perform so badly when used in conjunction with time-varying channels. Thus, the performance of an adaptive equaliser depends not only on the convergent speed, but also upon the instantaneous signal-to-noise ratio (rather than a mean signal-to-noise ratio).

When designing a FIR equaliser for a CDMA downlink receiver it is generally assumed that the equaliser should be as long as possible in order to produce a true inverse of the multi-path channel. Ghauri and Slock, cited above, state that "it is a well known result that longer equalizers give better results". However we have appreciated that this assumption is based on the expectation that the true values for all weights can be obtained, whereas in a practical system the estimates for weights are noisy. Since the magnitude of every weight is different, the corresponding signal-to-noise ratio is also different. The estimation errors for small-value weights will be bigger than those for large-value weights in a noisy environment. Usually, small-value weights are also far from the center of the FIR filter. When the instantaneous signal-to-noise ratio is high, the benefits brought about by the small-value weights is bigger than the sum of the estimation errors, and hence the overall effect will be good. Otherwise, that is where the instantaneous signal-to-noise ratio is low, the small-value weights will lead to a worse result and should be removed from the equaliser. So we have appreciated that the optimum equaliser length in a time-varying noisy environment is variable. We make use of this appreciation in the most preferred embodiments of the invention, where an adaptive order equaliser is used prior to de-multiplexing received CDMA signals which have been pre-processed to improve the signal to noise ratio. Other embodiments use fixed—order adaptive equalisers similarly.

SUMMARY OF THE INVENTION

In a first aspect the present invention provides, in a wireless CDMA system in which orthogonal spreading codes are used, a method of reducing multiple access interference caused by a loss of orthogonality between multiple spread spectrum communications signals, the method comprising the steps of: receiving over a multi-path channel the multiple communications signals; passing the received signals through a plurality of correlation branches and combining the outputs of the correlator branches to produce a combined signal; passing the combined output signal through an adaptive equaliser to restore orthogonality; and demodulating the equaliser output.

The weights and length may be calculated in an adaptive loop which includes pilot demodulation. Such a solution was proposed in our co-pending Singapore patent application no. 200202669-8, the disclosure of which is hereby incorporated. The presence of an adaptive loop of this form makes it possible for the method to be operated without an additional channel estimation needed by common equalisers.

In a second aspect the invention provides a method of reducing multiple access interference between multiple communications signals, the method including the steps of: (i) receiving over a multi-path channel the multiple communications signals; (ii) recovering from the received signals a plurality of signals of interest each of which corresponds to a different one of the paths of the multi-path channel; (iii) estimating a weight for each of the paths of each of the signals recovered in step (ii); (iv) offsetting each of the recovered signals by an appropriate delay; (v) applying to each of the recovered signals a scale factor which is the conjugate of the corresponding weight estimated in step (iii); (vi) after carrying out steps (iv) and (v) on the recovered signals combining them to produce a combined signal; and (v) passing the combined signal through an equaliser to produce an output; and (vi) demodulating the equaliser output.

Preferably, between steps (v) and (vi) a step is carried out of calculating the weights and length in an adaptive loop which includes a pilot demodulator.

In a third aspect the invention provides an apparatus for use in a receiver in a communications system in which system signals are transmitted over multi-path channels, the apparatus including: means to recover from a signal received over one of said multi-path channels a plurality of signals of interest, each of the recovered signals corresponding to a different one of the paths of the one multi-path channels; means to estimate a weight for each of the paths of each of the recovered signals; means to offset each of the recovered signals by an appropriate delay; means to apply to each of the recovered signals a scale factor which is the conjugate of the respective weight; means to combine the recovered signals after their offsetting and scaling to produce an composite signal; an equaliser to process the composite signal to produce an equalised signal; and means to de-spread and de-scramble the equalised signal to produce a desired signal.

Preferably the apparatus further comprises an adaptive loop which includes a pilot demodulator.

In a fourth aspect the invention provides a signal processor for a wireless receiver for use in a communications system in which the receiver receives signals transmitted over multi-path channels, including processing means to: recover from a signal received over one of said multi-path channels a plurality of signals of interest, each of the recovered signals corresponding to a different one of the paths of the one multi-path channels to estimate a weight for each of the paths of each of the recovered signals; to offset each of the recovered signals by an appropriate delay; to apply to each of the recovered signals a scale factor which is the conjugate of the respective weight; to combine the recovered signals after their offsetting and scaling to produce a combined signal; to provide an adaptive equalisation function for the processing of the combined signal and to produce therefrom an equalised signal; and to demodulate the equalised signal to recover a desired signal.

Preferably the adaptive equalisation function is provided using an adaptive loop which includes pilot demodulation.

In a fifth aspect the invention provides a mobile terminal for use in a CDMA communications system, the terminal including: a user interface adapted to allow a user to control the mobile terminal and to input local service signals for transmission and to hear remote speech signals recovered from received signals; a transmitter adapted to transmit the local service signals to a base station via a radio frequency transmit signal; and a receiver adapted to recover remote service signals from a received composite signal; the receiver including: a plurality of rake fingers to recover from a signal received over one of said multi-path channels a plurality of signals of interest, each of the recovered signals corresponding to a different one of the paths of the one multi-path channels; means to combine the recovered signals from the rake fingers to produce a combined signal; an equaliser to process the combined signal and to increase the orthogonality thereof; and a demodulator to demodulate the output of the equaliser.

Preferably the receiver includes an adaptive loop for controlling the equaliser which includes a pilot demodulator.

BRIEF DESCRIPTION OF THE DRAWINGS

Embodiments of the present invention will now be described, by way of example only, with reference to the accompany figures in which.

DETAILED DESCRIPTION OF ILLUSTRATIVE EMBODIMENTS

Figure 1:
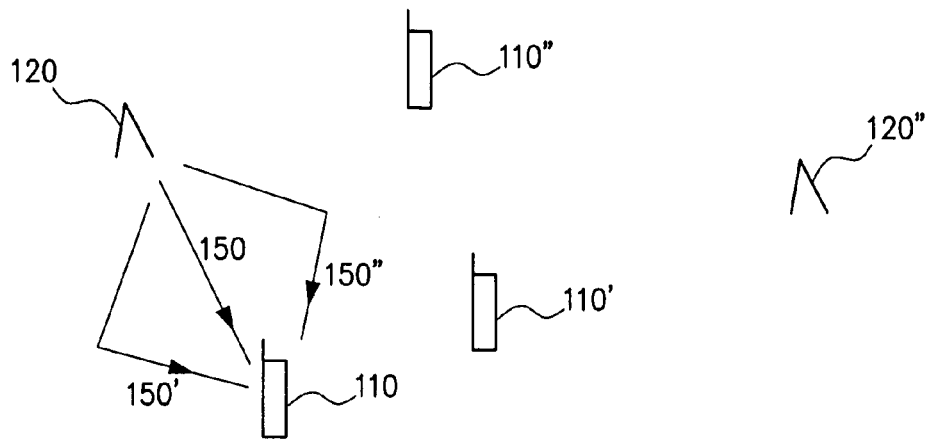
FIG. 1 is a schematic diagram of a cellular radio system.

FIG. 1 is a schematic diagram of a cellular radio communications system 100 which uses a multiple access technology such as wideband CDMA (WCDMA) for communication between users of user terminals 110 (for example, mobile phones) and base stations 120. A plurality of base stations 120, 120' and 120" are provided for wireless communication with a greater plurality of mobile terminals, 110, 110', 110", etc. Signals from a mobile terminal 110 travel over free space on the uplink to base station 120. From the base station 120 the signals pass to a base station controller. The base station controller may be coupled to a mobile switching center (MSC), and MSC may be connected in turn to a fixed communications network such as the public switched telephone network (PSTN) to permit signals from the user terminal 110 to be passed to a subscriber of the fixed network and vice versa. The fixed communications network will also carry signals from the user terminal 110 to other users or subscribers of the cellular radio system 100 as well as to users or subscribers of systems of other operators.

Signals from the mobile base station 120 travel also over free space on the downlink from the base station to the mobile terminals 110, 110', 110". As with almost any radio communication system, there may be multi-path propagation of signals on the downlink between the base station 120 and the mobile terminal 110, for example 150, 150' and 150", etc. In particular some of the signals are reflected off buildings or other man made structures which are located between the base station 120 and the mobile terminal 110. Once signals have been reflected for a first time they may be reflected several times before finally reaching the user terminal 110. The presence of natural features such as hills and mountains may also contribute to multi-path propagation. Typically each different transmission path gives rise to a different delay. In general, each transmission path has a different length and different reflection conditions and this gives rise to different attenuation levels as well as different phase rotation. These different propagation properties disturb the orthogonality of the spreading codes for the users served by one base station. The loss of orthogonality gives rise to multiple access interference MAI. The same problem can arise both on the downlink and the uplink. In each case there is a challenge to the designer of the receiver in finding a workable solution to the problem of MAI. However, because of the constraints on the physical size, power consumption and cost of mobile terminals, which do not apply to the same degree to base stations, the problem is greater with the design of the receiver for the mobile terminal.

Figure 2:
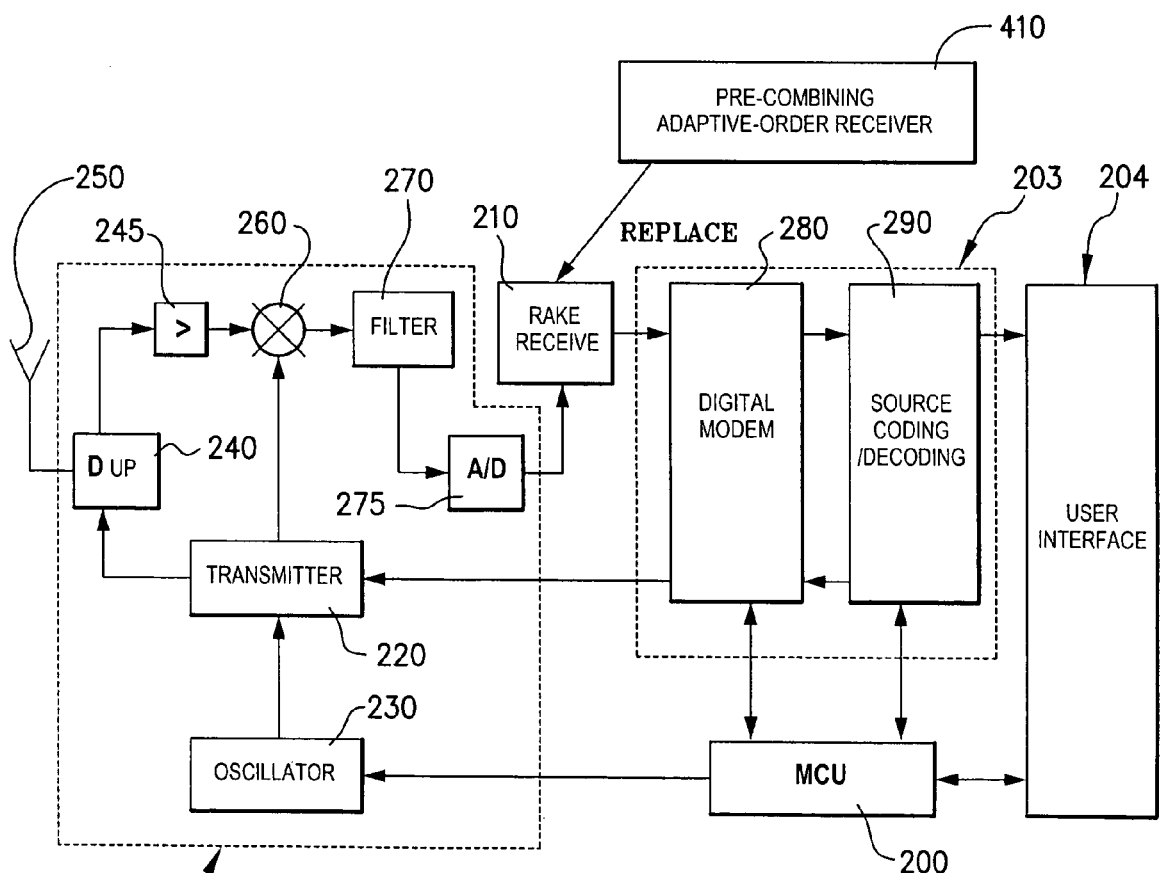
FIG. 2 is a functional block diagram of a known mobile terminal for use with the cellular radio system of FIG. 1.

FIG. 2 is a functional block diagram of a conventional mobile terminal 110 for use with the cellular radio system of FIG. 1. The mobile terminal 110 includes a micro controller unit (MCU) 200, an RF transceiver 202, a digital signal processor (DSP) 203 and a user interface 204. The mobile terminal 110 may also include external interfaces (not shown) for communication with a computer, LAN, or other device.

The RF transceiver 202 provides the wireless link between the mobile terminal 110 and a base station 120. The RF transceiver 202 has a receiver 210, here of conventional rake type, a transmitter 220, oscillator 230, an antenna coupling circuit 240 and an antenna 250. The antenna is coupled to the transmitter 220 and receiver 210 by the antenna coupling circuit 240 which includes a duplexer for isolating transmit and receive signal paths during full duplex transmit and receive operations. Half duplex operations may also be supported and a switch provided to multiplex the antenna 250 between the transmitter 220 and the receiver 210. Transmit band and receive band filters in the duplexer provide the necessary isolation between the transmit and receive signal paths in the transceiver 202.

The RF signal is first amplified by amplifier 245, down converted by unit 260 to a base band signal, filtered by a filter 270 and A/D converted by an analogue/digital converter 275. The output of the converter 275 is sent to the Rake receiver 210 to process the CDMA downlink signal from the base station 120. Conversely, the transmitter 220 receives base band signals from the DSP 203, amplifies them and then uses the amplified signals to modulate an RF carrier to send as uplink signals to the base station 120. The oscillator 230 provides reference signals used for frequency translation in the receiver 210 and in the transmitter 220.

The DSP 203 includes a digital modem 280 and a source coder/decoder 290. Source coder/decoder 290 includes a speech coder for digitising and coding speech for transmission on the uplink, as well as for decoding speech signals received on the downlink, converting them to audio signals to be output over the user interface 204.

The digital modem 280 processes digital signals to make communications between the mobile terminal 110 and the base station 120 more robust.

The micro controller unit 200 supervises the operation of the mobile terminal 110 and administers the procedures associated with the communication protocol being used. The MCU 200 typically includes a microprocessor and supporting peripherals facilitating control of the mobile terminal. Usual peripherals include timer/counter units, pulse-width modulations (PWM) generators, bi-directional input/output, serial communications interfaces and other modules to permit the microprocessor to interface flexibly with the various sub elements and circuitry of the mobile terminal 110. The microprocessor may include hardware computational units to speed up mathematical operations such as squaring and division.

The MCU will generally use timers to track network time, using that information to assist in synchronising the mobile terminal 110 with the required transmit and receive signal timing. The timing information may be used to identify frame boundaries and slot indexes associated with a received CDMA signal. The MCU also uses timers to trigger specific tasks as the mobile terminal 110 switches between different operating modes (such as sleep, receive, talk, standby etc.). The MCU also uses register files in memory to store calibration data, the electronic serial number (ESN) of the user (which may be used in authentication or for other security purposes), and other information needed on a longer term basis.

The MCU 200 also implements the communications protocols used by the mobile terminal 110. The communications protocol specifies timings, multiple access approach, modulation format, frame structure, power level, as well as many other aspects of the operation of the mobile terminal 110. The MCU 200 inserts signalling messages into the transmitted signals sent to the base station 120 and extracts signalling messages from the received signals. The MCU 200 responds to signalling messages received from the base station 120 in accordance with the relevant communications protocol. When the user inputs commands by the user interface 204, the commands are sent to the MCU 200 for action. The MCU also provides power management to the mobile terminal 110, including monitoring battery energy level, charging the battery, and minimising power consumption by changing modes. In general there are three modes of operation for the mobile terminal: idle, receive and talk. In idle mode the MCU 200 deactivates most functions except the digital system clock. In receive mode the MCU activates the receiver 210 and the digital modem 280. It further demodulates the paging channel in the received CDMA signal until it receives a valid paging message and then switches to talk mode. In talk mode the entire mobile terminal is activated to support two-way communication.

The MCU and the DSP use dedicated or shared buses to connect to memory (not shown). The memory is typically segmented into blocks that hold the start-up code, control software, DSP firmware, and temporary data, etc.

In mobile units according to embodiments of the invention the conventional rake receiver 210 is replaced with a receiver which uses pre-combining followed by an equaliser based signal demodulator (shown as 410 in FIG. 2). The pre-combining portion of the receiver can use a conventional rake arrangement but without demodulation within the rake fingers. Preferably the equaliser which follows the pre-combining portion is an adaptive order equaliser in which the order of the equaliser is adjusted adaptively according to the calculated error signal for each order. This approach will be discussed further with reference to FIGS. 3 and 4.

Figure 3:
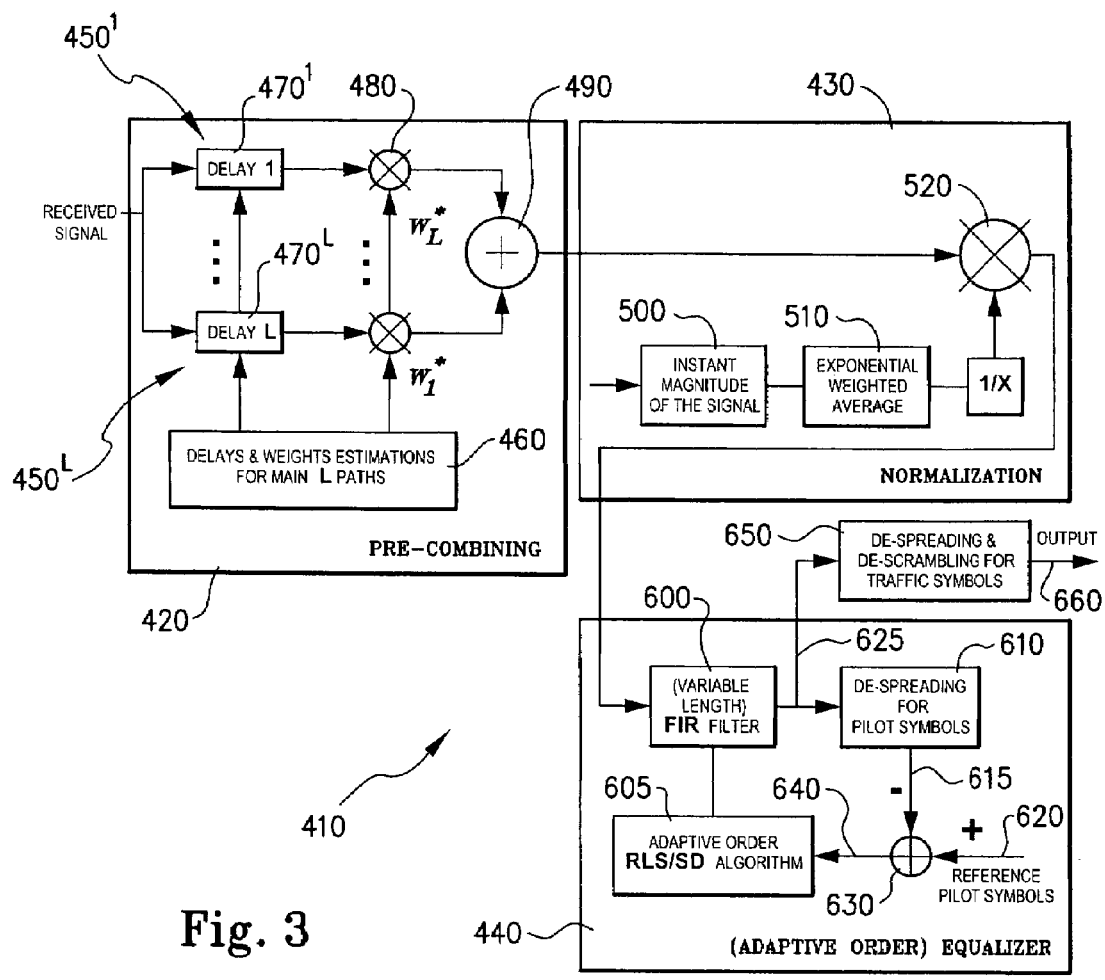
FIG. 3 is a schematic diagram of a receiver according to an embodiment of the invention.

The structure of the new receiver 410 is shown in FIG. 3. The new receiver has three main sections: the pre-combining stage, 420; the normalisation stage 430; and the equalisation stage 440. Although FIG. 3 shows the equalisation stage as including an adaptive order equaliser, the invention can also be implemented using a fixed—order equaliser.

The pre-combining stage 420 is generally similar to a conventional rake receiver except that the received signals are not subject to de-spreading here (except to estimate path weights): de-spreading (demodulation) occurs in the equalisation stage 440.

Within the pre-combining stage 420 there are several parallel fingers $450^1$ to $450^L$. Within the multi-path composite signal received from the base station 120 several strong paths are identified and appropriate path weights are estimated using a sliding window or an exponential weighted average approach. Within each finger 450 the received signal is subjected to a different delay, the delays being decided by a module 460 as in a rake receiver. In contrast to known receivers, the fingers do not include CDMA demodulators.

The received signal is passed to the fingers 450 of the pre-combining stage which are associated with the strong paths identified. In each finger the path weight is estimated by de-scrambling and de-spreading the pilot signal, then forming an exponential weighted average or sliding window average. The conjugate of the average results is then calculated to give the estimated weight for the relevant path. The received signal is multiplied by the estimated path weights, but is not at this stage subject to de-scrambling and de-spreading as it would be in a conventional rake receiver. The outputs of all the fingers $450^1$ to $450^L$ are then added together in adder 490 to provide the output of the pre-combining stage. Each finger 450 includes a delay-offset unit 470 and a scale factor (the conjugate of the relevant path weight) is also applied, at 480, to the signal in that branch. Within this pre-combining stage 420 of the receiver 410 there is no de-spreading of the signal symbols as there is in a rake receiver (except for that used in estimating the path weights). The pre-combining smoothes the signal and improves the signal to noise ratio because of the multi-path diversity. The pre-combining stage is preferably followed by a normalization stage 430 because the pre-combining process changes the magnitude of the signal. The usual automatic gain controller (AGC), which is provided in the receiver up-stream of the pre-combiner is unable to compensate for the change in signal magnitude caused by the pre-combiner as this happens downstream of the pre-combiner. The normalisation stage takes the instantaneous magnitude of the signal output by the pre-combining stage, at part 500, the exponential weighted average of the magnitude is calculated, at 510, and this is used to normalise the signal at 520.

The output of the normalisation stage 430 is then passed to the equalisation stage 440 and the signal is de-spread (demodulated).

The equaliser stage 440 receives the output of the normalisation stage 430 which is passed through a finite impulse response (FIR) filter 600. In the example shown an adaptive order equaliser is used. The order of the equaliser is adjusted according to the calculated error signal for each order. In a preferred embodiment the equaliser is preferably adjusted according to a recursive least square (RLS) algorithm such as that developed below. Of course, other approaches to order adaptation can be used. One such alternative approach is steepest descent (SD). An algorithm to apply SD is also developed below.

The equaliser 440 uses the CDMA pilot signal for adaptation. The equaliser 440 processes the pre-combined signals output by the normalisation stage to produces a chip estimate. The chip-rate output 625 of the equaliser is de-spread to reveal pilot symbols 615 and these are compared with the known pilot sequence symbols 620. The difference is then used as an error signal 640 in an adaptive algorithm such as RLS. The weights in the FIR filter are controlled in accordance with the adaptive algorithm, according to conventional methods.

The desired user's channel is recovered by de-spreading and de-scrambling 650 the output of the equalizer. The desired traffic symbols are recovered at an output 660.

Figure 4:
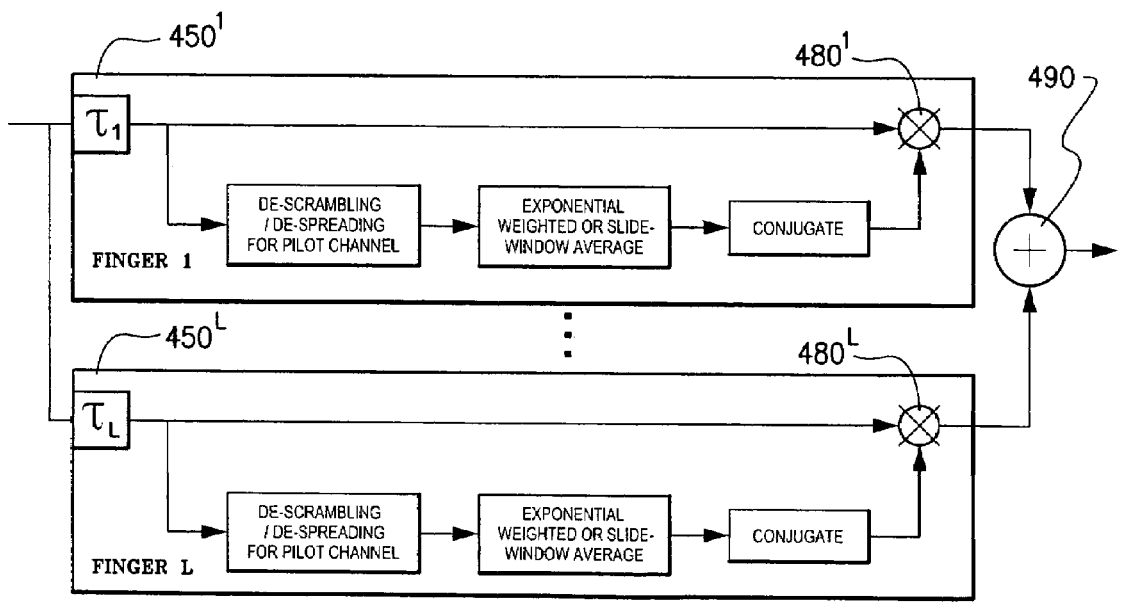
FIG. 4 is a schematic diagram showing how pre-combining is effected in a receiver according to an embodiment of the invention.

The pre-combining process is advantageous irrespective of the type of adaptive equaliser which follows it. So, it can be followed by a fixed order adaptive equaliser or an adaptive order adaptive equaliser. However, if pre-combination is used with an adaptive order equalizer considerable performance improvements can be achieved if the length of the equalizer is appropriately adjusted. As already mentioned, there is an optimum length for an FIR equalizer in a noisy environment and the optimal length varies with the properties of the channel which is being equalized. In general, order optimisation is best achieved using "minimum output square-error". By pre-combining and using adaptive order adjustment the performance of the receiver of FIGS. 2 to 4 is considerably improved compared to common adaptive order equalizers.

Figure 5:
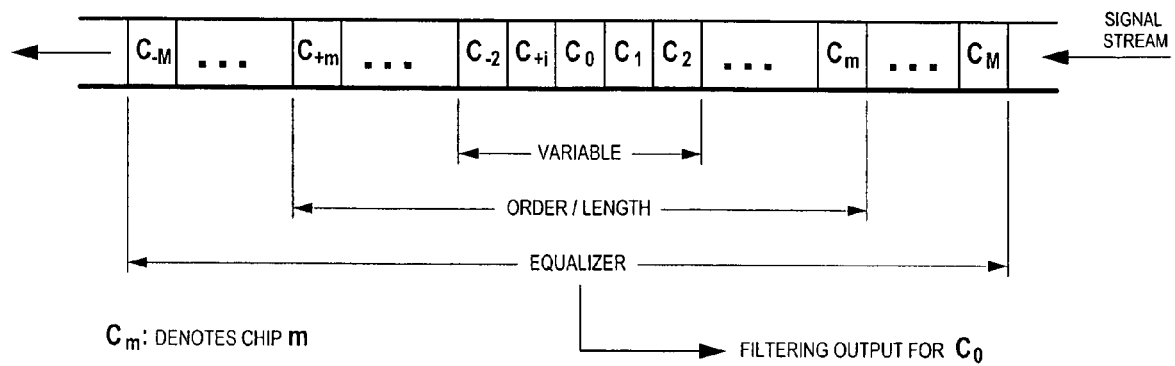
FIG. 5 is a schematic diagram representing a variable length equaliser.

The variable order FIR filter is shown in FIG. 5. Let the length of the FIR filter be 2m−1. Then, from FIG. 5, we can see that m can be changed from 1 to M+1. That is, the shortest filter has only 1 weight, while the longest filter has 2M+1 weights. The length of the filter is determined by the adaptive algorithm which is described below. Let the transmitted multi-user chip sequence from a base station be:

$$x(n) = spm(n) \sum_m \sum_{k=1}^{K} a_k b_k(m) c_k(n - mN), \quad (1)$$

where $a_k$, $b_k(m)$ and $c_k(n)$ are the amplitude, the data and the spreading code for user k in one cell. The period of the spreading code $c_k(n)$ is equal to the processing gain, N. The signals of all users in a cell are combined synchronously and scrambled by an aperiodic random code spm(n).

The multi-path fading channel is modeled as a MA (moving average) process and the received signal can be represented as a received signal vector:

$$y(n) = Tx(n) + \xi(n) \quad (2)$$

where, $$y(n) = [y(nN+1) \ldots y(nN+N+L-1)]^T \quad (3)$$

is the received signal vector consisting of the signal samples, $$x(n) = [x(nN-L+2) \ldots x(nN+N+L-1)]^T, \quad (4)$$

$$\xi(n) = [\xi(nN+1) \ldots \xi(nN+N+L-1)]^T \quad (5)$$

is a white Gaussian noise vector, and $$T = \begin{bmatrix} h(L) & \cdots & h(1) & 00 & \cdots & 0 \\ & \vdots & & & \vdots & \\ & \vdots & & & \vdots & \\ 0 & \cdots & 0 & h(L) & \cdots & h(1) \end{bmatrix} \quad (6)$$

is the L-path channel matrix, $(\ )^T$ denotes transpose in this specification.

For pre-combining, we reorganize the received signal vector as a data matrix as $$Y_{pre} = \begin{bmatrix} y(nN+1) & \cdots & y(nN+N) \\ & \vdots & \\ y(nN+L) & \cdots & y(nN+L+N-1) \end{bmatrix}, \quad (7)$$

and construct a channel vector as $$L = [\hat{h}(L) \ldots \hat{h}(1)]^T \quad (8)$$

where, $\hat{h}(l)$ denotes the estimation of the path l, which can be obtained by the same method as in a rake receiver.

Then the output of the pre-combining block or the input of the equalizer can be written as:

$$Y_{equ} = Y_{pre}{}^T L^* \epsilon C^{N \times 1} \quad (9)$$

The $Y_{equ}$ consists of $y_{equ}(i)$, $y_{equ}(i+1)$ ... After which, the data matrix can be constructed using the output of the pre-combining process as:

$$Y(n) = \begin{bmatrix} y_{equ}(nN-M+1) & \cdots & y_{equ}(nN+N-M) \\ \vdots & & \vdots \\ y_{equ}(nN+1) & \cdots & y_{equ}(nN+N) \\ \vdots & & \vdots \\ y_{equ}(nN+M+1) & \cdots & y_{equ}(nN+N+M) \end{bmatrix} \quad (10)$$

Constructing the de-scrambling/de-spreading vector of user k:

$$C_k(n) = diag(spm(n,1) \ldots spm(n,N)) \cdot c_k \quad (11)$$

where $c_{k=[ck1} \ldots c_{kN]}{}^T$ is the spreading code waveform of user k. spm(n,j) is the jth chip value in nth symbol of the aperiodic random code. Let $c_1$ denotes the spreading code for the pilot channel.

Then the algorithm is as follows:
Initialize $w(0) = 0 \epsilon C^{(2M+1) \times (M+1)}$, forget_w=a, forget_R=b, eo=0$\epsilon C^{(M+1) \times 1}$ $$\tilde{b}(n) = w(n)^H Y(n) C_1(n)^* \epsilon C^{(M+1) \times 1} \quad (12)$$

$$e(n) = \text{pilot} - \tilde{b} \epsilon C^{(M+1) \times 1}(n) \quad (13)$$

where $e_m(n)$ is the mth element in the vector e(n) and a and b are selected parameters called forgetting factors, which can be chosen according experimentally as in many conventional systems. Their value ranges from 0 to 1.

For optimal order selection:

$$eo(n) = \text{forget\_w} \cdot eo(n-1) + (1 - \text{forget\_w}) \cdot e(n), \quad (14)$$

$$m_o(n) = \underset{i}{\text{argmin}}\{eo_i, i = 1, \ldots, M+1\} \quad (15)$$

where, $eo_i$ means the ith element of the vector eo(n).
The optimal length of the equalizer at instant n is $m_o(n)$. Therefore the output traffic symbol at instant n should be $$\tilde{b}_k(n) = w_{m_o}(n)^H Y(n) C_k(n)^* \quad (16)$$

where, $w_m(n)$ means the mth column of the matrix w(n).
For m=1 to M+1, let $$dim_m = diag(\underbrace{0, \ldots, 0}_{M-m+1}, \underbrace{1, \ldots, 1}_{2m-1}, \underbrace{0, \ldots, 0}_{M-m+1}), \text{ and}$$

$$chn\_vec_m = dim_m Y(n) C_k(n)^*$$

For the steepest-descent (SD):

$$w_m(n+1) = w_m(n) + \text{Forget\_R} \cdot chn\_vec_m \cdot e_m(n)^* \quad (17)$$

—For recursive least square(RLS):

$$w_m(n+1) = w_m(n) + R_m^{-1}(n) \cdot chn\_vec_m \cdot e_m(n)^* \quad (18)$$

where $$R_{m,2m-1}^{-1}(n+1) = R_{m,2m-1}^{-1}(n) - \frac{R_{m,2m-1}^{-1}(n) chn\_vec_{m,2m-1} \cdot}{1 + chn\_vec_{m,2m-1}^H \cdot} \quad (19)$$
$$\frac{chn\_vec_{m,2m-1}^H R_{m,2m-1}^{-1}(n)}{R_{m,2m-1}^{-1}(n) \cdot chn\_vec_{m,2m-1}}$$

and where $R_m^{-1}(0) = \begin{bmatrix} 0 & 0 & 0 \\ 0 & \frac{\delta I}{2m-1} & 0 \\ 0 & 0 & 0 \end{bmatrix} \quad (20)$ $R_{m,2m-1}^{-1} \epsilon C^{(2m-1) \times (2m-1)}$ is a matrix consisting of the elements from row M−m+2 to row M+m and from column M−m+2 to column M+m of $R_m^{-1}$ similarly, $chn\_vec_{m,2m-1} \epsilon C^{(2m-1) \times 1}$ is a vector consisting of the elements from row M−m+2 to row M+m of $chn\_vec_m$, while $\delta$ is a large positive real number.

Figure 6:
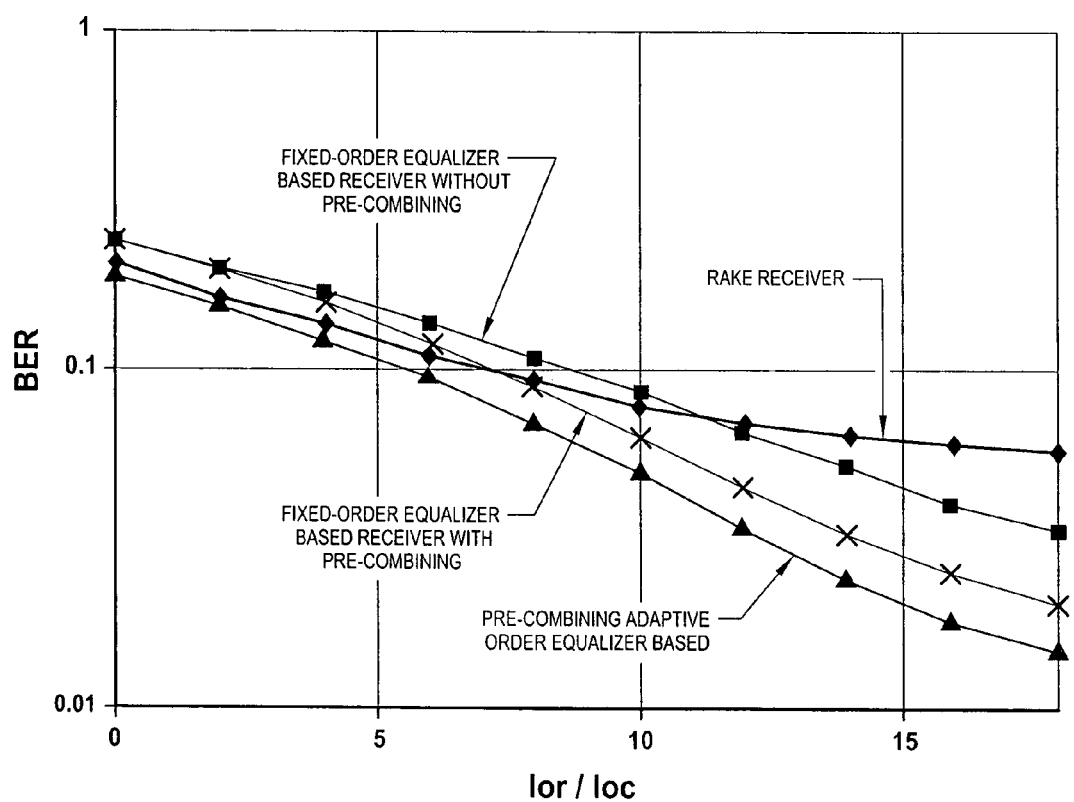
FIG. 6 is a plot comparing the bit error rate (BER) performance of receivers according to embodiments of the invention with that of known receiver designs.

FIG. 6 illustrates the bit error rate performance of a conventional rake receiver, a receiver based on a fixed-order equaliser without pre-combining, and two receivers using pre-combining and according to the invention: one with a fixed-order adaptive equaliser and the other with an adaptive-order equaliser whose order is adapted according to the RLS algorithm developed above. FIG. 6 is a performance simulation result defined by parameters selected according to the HSDPA (high-speed downlink packet access) recommendations for WCDMA systems. The multipath fading channel is a 4-path channel with Doppler frequency 6 Hz, and the forgetting factors are a=0.9 and b=0.98.

Figure 7:
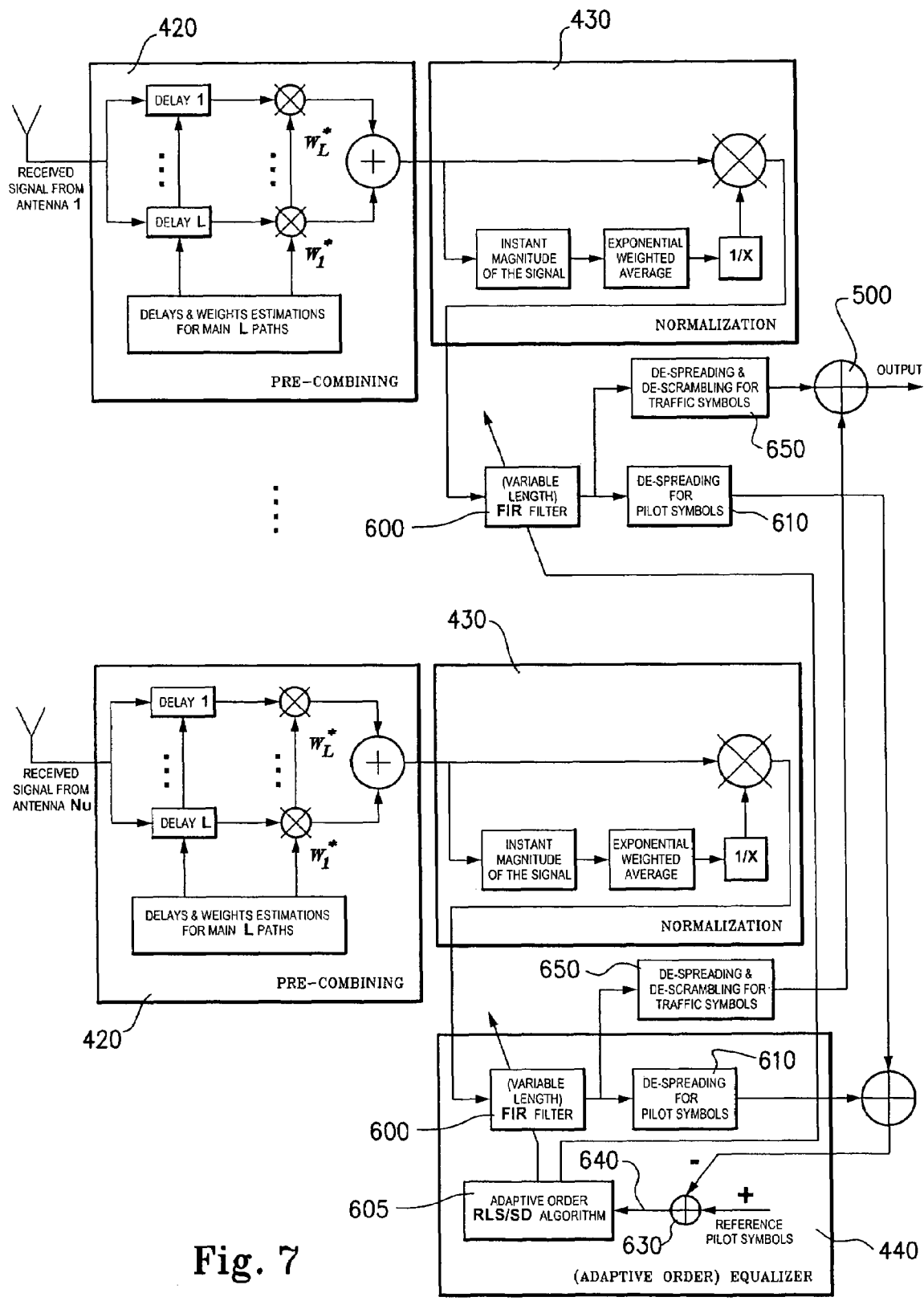
FIG. 7 shows how the diagram of FIG. 3 is modified in the case that there are multiple antennas.

FIG. 7 shows how the structure shown in FIG. 3 is varied in a second version of the embodiment, which includes multiple antennas (a number Nu). In this case, there is an antenna branch for each of the antennas. The antenna branch includes a pre-combining stage 420, a normalisation stage 430, an equalisation stage 440, and a de-spreader and de-scrambler unit 650 (demodulator). Each of these stages are equivalent to the corresponding stages shown in FIG. 3, but the pilot de-spreading results for each antenna branch are added to the results of the same process in the other antenna branch(es). The sum of the pilot de-spreading is compared with the "reference" to generate the error signal 640. The error signal 640 is used by a single adaptive algorithm RLS or SD module 605 to calculate the weights and optimal length of the respective FIR equaliser 600 for each antenna branch. The outputs of the demodulators 650 are combined by an adder 500.

The process is as follows. This is equivalent to the mathematical description given above in the case that the number of antennas, Nu=1.

a) In each antenna branch, received signal after pre-combining and normalization is fed to the variable length (or fix length) FIR equalizer, the equalization output is sent to desired signal de-modulator (de-scrambling plus de-spreading in WCDMA system) and pilot de-modulator (de-scrambling in WCDMA system).

b) The pilot de-modulation outputs from all antenna branches are added. 30 The sum is subtracted from the "reference signal". The subtraction results is so-called "error signal". If the variable length equalizer is adopted, the "error signal" will be calculated M+1 times corresponding to different equalizer lengths in one iteration, and the M+1 "error signals" are exponential weighted average with their previous values, respectively. Please see equation (14) in the draft. In equation (14), e is a column vector whose elements are the M+1 error signals respective. eo is also a column vector that includes M+1 results of the exponential weighted average of the error signals corresponding to different equalizer lengths. In (14), forget_w can be chosen in the range from 0 to 1. The exact value of forget_w depends on the application environment. Simultaneously, the index for minimum exponential weighted error signal is selected and kept following the rule in equation (15). If the fixed length equalizer is used, the error signal will only be calculated one time, and this error signal is kept. It can also be represented by (14). In this case, forget_w=0, and there is just one element in e and eo.

c) The adaptive algorithm will calculate the weights and optimal length for equalizers in all antenna branches using the exponential weighted error signals and others described below. The calculating algorithm can be steepest-descent (SD) in equation (17) or recursive least square (RLS) in equation (18).

If SD is used, the current weights for equalizers are determined by the exponential weighted error signal (eo), the channel vectors ($chn\_vec_m$), forgetting vector b and the weights last time. $chn\_vec_m$ is formed by the product of a window function $dim_m$ (show in p15, line 6 in the draft) and despread results for pilot ($YC_1$) $dim_m$ admits 2m−1 elements in the central of the $chn\_vec_m$ and disable the other elements. This is the necessity for choosing the optimal equalizer length (order). Index m should be chosen from 1 to M+1 corresponding to M+1 different equalizer lengths if the variable length equalizers are used. In every antenna branch, this calculation is the same.

If RLS is used, the current weights for equalizers are determined by the exponential weighted error (eo), the channel vectors ($chn\_vec_m$), pseudo-inverse $R_m^{-1}$ forgetting vector b and the weight last time, $chn\_vec_m$ is formed by the same way in SD algorithm. The difference is calculation of the pseudo inverse $R_m^{-1}$. The pseudo inverse can be calculated using equations (19) and (20) recursively. In every antenna branch, this calculation is the same.

By the above process, the equalizer weights and the optimal length (order) for the equalizer are calculated recursively.

Also, by the above process, we have obtained the optimal equalizer length "$m_o$" and the corresponding weights $Wm_o$ for each antenna branch. Therefore the output of the detected user signal is shown in equation (16).

Many variations are possible within the scope of the invention. For example, although the advantages are explained above of including an adaptive loop for the equaliser, particularly one incorporating pilot demodulation, this not necessary for operation of certain embodiments of the invention.

The invention claimed is:

1. A method of reducing multiple access interference caused by a loss of orthogonality between multiple spread spectrum communications signals, in a CDMA system the method comprising the steps of:
    receiving over a multi-path channel the multiple spread spectrum communications signals;
    passing the received signals through a plurality of correlation branches and combining the outputs of the correlation branches to produce a combined signal;
    passing the combined signal through an adaptive equaliser; and
    demodulating the equaliser output,
    wherein a path weight is estimated for each of the plurality of correlation branches by de-scrambling and de-spreading each received signal, forming an exponential weighted average or a sliding window average, and using a conjugate of the average to calculate a weighted average for each path, prior to combining the outputs of the correlation branches, using a plurality of parallel fingers that are independent of a CDMA demodulator.

2. A method according to claim 1 further including adapting the equaliser using an adaptive loop including pilot de-modulation.

3. A method of reducing multiple access interference between multiple communications signals, the method comprising:
    receiving over a multi-path channel the multiple communications signals;
    recovering from the received signals a plurality of signals of interest each of which corresponds with a different one of the paths of the multi-path channel;
    estimating a weight for each of the paths of each of the signals recovered in the recovering step;
    offsetting each of the recovered signals by an appropriate delay;
    applying to each of the recovered signals a scale factor which is the conjugate of the corresponding weight estimated in the estimating step;
    executing the offsetting step and the applying step on the recovered signals;
    combining the recovered signals to produce a combined signal;
    estimating a path weight for each of a plurality of correlation branches by de-scrambling and de-spreading each received signal;
    forming an exponential weighted average or a sliding window average using a conjugate of the average to calculate a weighted average for each path, prior to producing the combined signal;
    using a plurality of parallel fingers that are independent of a CDMA demodulator;
    passing the combined signal through an equaliser to produce an output; and
    demodulating the equaliser output.

4. A method according to claim 3 further including adapting the equaliser using an adaptive loop which includes pilot demodulation.

5. A method as according to claim 1, wherein a normalisation process is carried out prior to passing the combined signal through the equaliser.

6. A method as claimed in claim 5, wherein the normalisation process involves taking an exponential weighted or slide window average of the combined signal.

7. A method as claimed in claim 1, wherein the equaliser is an adaptive order equaliser whose length is adaptively adjusted.

8. A method as claimed in claim 7, wherein the order of the equaliser is adjusted according to an adaptive order algorithm of which optimisation criterion is minimum mean square error.

9. A method as claimed in claim 1, wherein the equaliser applies a recursive least square algorithm.

10. An apparatus for use in a receiver in a communications system in which system signals are transmitted over multi-path channels, the apparatus including:

means to recover from a signal received over one of said multi-path channels a plurality of signals of interest, each of the recovered signals corresponding to a different one of the paths of the one multi-path channels;

means to estimate a weight for each of the paths of each of the recovered signals;

means to offset each of the recovered signals by an appropriate delay;

means to apply to each of the recovered signals a scale factor which is the conjugate of the respective weight;

means to combine the recovered signals after offsetting and scaling to produce a composite signal, wherein a path weight is estimated for each of a plurality of correlation branches by de-scrambling and de-spreading each received signal, forming an exponential weighted average or a sliding window average, and using a conjugate of the average to calculate a weighted average for each path, prior to combining the recovered signals, using a plurality of parallel fingers that are independent of a CDMA demodulator;

means to normalise the composite signal;

an equaliser to process the composite signal to produce an equalised signal; and means to demodulate the equalised signal to produce a desired signal.

11. The apparatus according to claim 10 further including an adaptive loop which includes a pilot demodulator.

12. A signal processor for a wireless receiver for use in a commununications system in which the receiver receives signals transmitted over multi-path channels, the signal processor adapted to:

recover from a signal received over one of said multi-path channels a plurality of signals of interest, each of the recovered signals corresponding to a different one of the paths of the one multi-path channels;

estimate a weight for each of the paths of each of the recovered signals;

offset each of the recovered signals by an appropriate delay;

apply to each of the recovered signals a scale factor which is the conjugate of the respective weight;

combine the recovered signals after offsetting and scaling to produce a combined signal, wherein a path weight is estimated for each of a plurality of correlation branches by de-scrambling and de-spreading each received signal, forming an exponential weighted average or a sliding window average, and using a conjugate of the average to calculate a weighted average for each path, prior to combining the recovered signals, using a plurality of parallel fingers that are independent of a CDMA demodulator;

normalise the combined signal;

provide an adaptive equalisation function for the processing of the combined signal and produce an equalised signal; and demodulate the equalised signal to recover a desired signal.

13. A signal processor according to claim 12 wherein the processor is arranged to adapt the adaptive equaliser using an adaptive loop including pilot demodulation.

14. A mobile terminal for use in a CDMA communications system, the terminal including:

a user interface adapted to allow a user to control the mobile terminal and to input local service signals for transmission and to hear remote service signals recovered from received signals;

a transmitter adapted to transmit the local service signals to a base station via a radio frequency transmit signal; and a receiver adapted to recover remote service signals from a received composite signal; the receiver including:

a plurality of rake fingers to recover from a signal received over one of said multi-path channels a plurality of signals of interest, each of the recovered signals corresponding to a different one of the paths of the one multi-path channels, wherein a path weight is estimated for each of a plurality of correlation branches by de-scrambling and de-spreading each received signal, forming an exponential weighted average or a sliding window average, and using a conjugate of the average to calculate a weighted average for each path, using a plurality of parallel fingers that are independent of a CDMA demodulator;

means to combine the recovered signals from the rake fingers to produce a combined signal;

an equaliser to process the combined signal and to increase the orthogonality thereof; and a demodulator to demodulate the output of the equaliser.

15. A mobile terminal according to claim 14 further including an adaptive loop for adapting the equaliser and including pilot demodulation.

16. A method according to claim 3, wherein a normalisation process is carried out prior to passing the combined signal through the equaliser.

17. A method according to claim 3, wherein the equaliser is an adaptive order equaliser whose length is adaptively adjusted.

18. A method according to claim 3, wherein the equaliser applies a recursive least square algorithm.

* * * * *